United States Patent

Dobratz et al.

[15] 3,644,740

[45] Feb. 22, 1972

[54] CONTROL CIRCUIT FOR BIASING A PHOTODETECTOR SO AS TO MAINTAIN A SELECTED FALSE ALARM RATE

[72] Inventors: Burton E. Dobratz, Manhattan Beach; Robert P. Farnsworth, Los Angeles, both of Calif.

[73] Assignee: Hughes Aircraft Company, Culver City, Calif.

[22] Filed: July 22, 1969

[21] Appl. No.: 846,300

[52] U.S. Cl. ................................250/211 J, 307/311, 356/4

[51] Int. Cl. ....................G01c 3/08, H01j 39/12, H03k 3/42

[58] Field of Search........................250/200, 211 J; 307/311; 178/7.3 E; 356/4, 5

[56] References Cited

UNITED STATES PATENTS 3,516,751 6/1970 Fruengel................................356/4 X

FOREIGN PATENTS OR APPLICATIONS 692,491 8/1964 Canada

*Primary Examiner*—James W. Lawrence
*Assistant Examiner*—T. N. Grigsby
*Attorney*—James K. Haskell and Walter J. Adam

[57] ABSTRACT

A circuit for controlling the bias supplied to an avalanche photodetector so as to maintain a "false alarm" rate within acceptable limits, while maximizing the photodetector sensitivity for those limits. The circuit is particularly useful in conjunction with laser-ranging (distance-measuring) equipment in which a timing interval is normally initiated coincident with the transmission of a light pulse and terminated coincident with the receipt of the reflected light pulse. The timed interval is, of course, indicative of the distance of the reflector from the transmitter and receiver. If the detector sensitivity is too high, various forms of noise can produce false alarms, i.e., signals indistinguishable from that attributable to the reflected light pulse. The subject circuit controls the bias on the photodetector to maintain a constant false alarm rate, e.g., 1 percent, during the timing intervals of interest, while permitting the detector sensitivity to be maximized for that rate. The circuit utilizes a pulse shaper which continually responds to input signal excursions exceeding a certain threshold level to control an integrator. If such excursions occur at a rate greater than the desired false alarm rate, the integrator will modify the detector bias to lower its sensitivity. On the other hand, if such excursions occur at a rate lower than the desired rate, the bias is modified to increase the detector sensitivity.

14 Claims, 3 Drawing Figures

INVENTORS.
BURTON E. DOPRATZ,
ROBERT P. FARNSWORTH,
BY
J K Haskell
ATTORNEY.

CONTROL CIRCUIT FOR BIASING A PHOTODETECTOR SO AS TO MAINTAIN A SELECTED FALSE ALARM RATE

The invention herein described was made in the course of or under a contract or subcontract thereunder, with the United States Army.

BACKGROUND OF THE INVENTION

1. Field of the Invention

This invention relates generally to a control circuit for controlling the bias supplied to a photodetector so as to maintain a false alarm rate within acceptable limits while maximizing the photodetector sensitivity for those limits.

The purpose and function of embodiments of the invention can be best described in terms of the general usage of photodetectors. In the majority of photodetector applications, the main goal is to obtain the maximum probability input signal detection while minimizing the probability of false alarms, i.e., responding to nonsignal inputs. In specific applications such as distance-measuring equipment using a pulsed light source, the false alarm rate is a function of the internal of time during which a particular "ranging" operation takes place, the amount of noise present and the photodetector sensitivity. An object of the present invention is to control the bias supplied to a photodetector in such a way that the false alarm rate is maintained at all times within acceptable limits, while maximizing the photodetector sensitivity. Such control yields maximum overall system performance.

2. Description of the Prior Art

The general usage of automatic gain control (AGC) has an objective similar to that of the present invention. In radar, colidar and other ranging or distance-measuring systems, it is common to sense the output signal amplitude, or the RMS value of the signal plus noise, prior to the use of threshold stages and to use the signal so sensed as the AGC control signal. This fails in many instances to maintain a constant false alarm rate since the spectrum of the signal may vary as a function of the relative amplitude of the various noise sources. Thermal noise may, for example, be a much different spectrum from the amplified photoelectron noise at the anode of a photomultiplier tube (PMT) in response to background illumination of the photocathode. Another example might be the variation in spectrum between a low quantum efficiency PMT with high current gain resulting in a few, high-current pulses of anode current as contrasted to a high quantum efficiency PMT having low current gain and yielding many small pulses randomly spaced but resulting in the same average anode current.

Since the probability of false alarm is a variable function of RMS signal level and depends upon the spectrum or makeup of the signal, it has been proposed to sense the actual false alarm rate remaining after the threshold stages of a ranging receiver. Attempts to control the gain or sensitivity of the photodetector by responding to the actual false alarm rate must be such as to prevent any large effect on the sensitivity by the presence of threshold-exceeding signals which may occur at a high pulse rate for a short period of time (i.e., 5,000 pulses per second for 200 microseconds while the false alarm rate may be 100 pulses per second).

Two known techniques for controlling the bias to avalanche photodetectors are a temperature compensation open-loop technique and a closed-loop technique utilizing an optical reference. Neither of these techniques specifically maintain a constant false alarm rate.

The temperature compensation technique uses a thermistor or other thermal sensor to measure the avalanche photodiode temperature. An electrical signal proportional to photodiode temperature controls a bias circuit. The bias control circuit is programmed to change photodiode bias with temperature in a way that is intended to yield optimum diode performance.

The closed-loop technique with optical reference source functions to maintain a constant detector responsivity. The optical reference, e.g., light-emitting diode, and associated drive circuitry must normally be temperature compensated to maintain a constant optical output. The drive circuit pulses the light-emitting diode at a repetition frequency well below the band-pass of the main amplifier but within the band-pass of the preamplifier. This reference signal is filtered and peak detected. The peak level detector output controls the avalanche photodiode bias. Constant detector sensitivity is maintained since any decrease appears as a decreased output of the peak level detector. A smaller signal here causes the bias control circuit to increase photodiode bias and thus its sensitivity. The band-pass characteristics of the main amplifier and feedback loop band-pass filter keep normal video signals separated from the optical reference signal.

SUMMARY OF THE INVENTION

Embodiments of the present invention are useful in facilitating the separation of a desired photo input signal from noise and in keeping the effective noise at a level which is compatible with a specified probability of false alarm. Embodiments of the present invention operate over wide ranges of detector sensitivity, background noise, etc.

More specifically, a specific object of the present invention is to provide a control circuit for automatically biasing an avalanche photodiode for greatest usable photo current gain and for maintaining this optimum operating point under conditions of aging, temperature change, circuit supply voltage change, changes in input optical noise level, and variations in circuit component values.

Embodiments of the invention find significant utility in laser rangefinder receivers for automatically adjusting avalanche photodiode photo current gains so as to maintain a constant false alarm rate.

In accordance with the invention, a closed-loop feedback path is employed to continually monitor the rate at which input signal excursions exceed a threshold level and to adjust photodetector sensitivity to statistically assure that within intervals of interest, e.g., ranging operation intervals, false alarms will occur at a certain rate, e.g., 1 percent. The feedback path adjusts photodetector sensitivity by producing a bias control signal related to the deviation between a desired false alarm rate and the measured false alarm rate. The control signal varies the photodetector bias until the desired false alarm rate is achieved. Under all operating conditions, the photodetector is biased for maximum sensitivity consistent with the allowed false alarm rate.

In a first embodiment of the invention, the photodetector output is amplified in a wideband video amplifier and fed to a threshold circuit and output jack. The threshold setting is based on diode dynamic range and for an allowable false alarm rate with nominal bias applied to the photodiode. The threshold circuit output is digital and of duration corresponding to the time the video amplifier output exceeds the threshold.

The first element of the feedback loop, the pulse shaper, serves the purpose of giving each noise pulse a constant length and amplitude. This is necessary to insure an unchanging 1:1 correspondence between the pulse integrator output and the noise pulse rate.

In a specific laser rangefinder application, the pulse shaper serves the purpose of eliminating normal ranging pulses from being counted as false alarms. The several pulses associated with a normal ranging sequence will contribute only one count to the false alarm rate since their separation in time is less than the duration of the pulse shaper output. The pulse shaper preferably comprises a single-shot multivibrator with an input lockout, i.e., after activation the multivibrator ignores further input pulses received during its astable period.

The pulse shaper output is fed to an integrator which translates the pulse rate into a proportional control voltage for controlling the photodiode bias. If the pulse rate tends to increase, bias voltage is decreased and photodiode noise output is decreased.

In a second embodiment of the invention, a first threshold circuit is employed to develop the data output signal and a second threshold circuit is used to develop the feedback signal for generating the bias control signal. More particularly, in this embodiment of the invention, a lower threshold is utilized in the feedback path in order to provide pulses to the integrator at a greater rate for a particular noise level so as to modify the photodetector bias in smaller increments.

DESCRIPTION OF THE PREFERRED EMBODIMENTS

Figure 1:
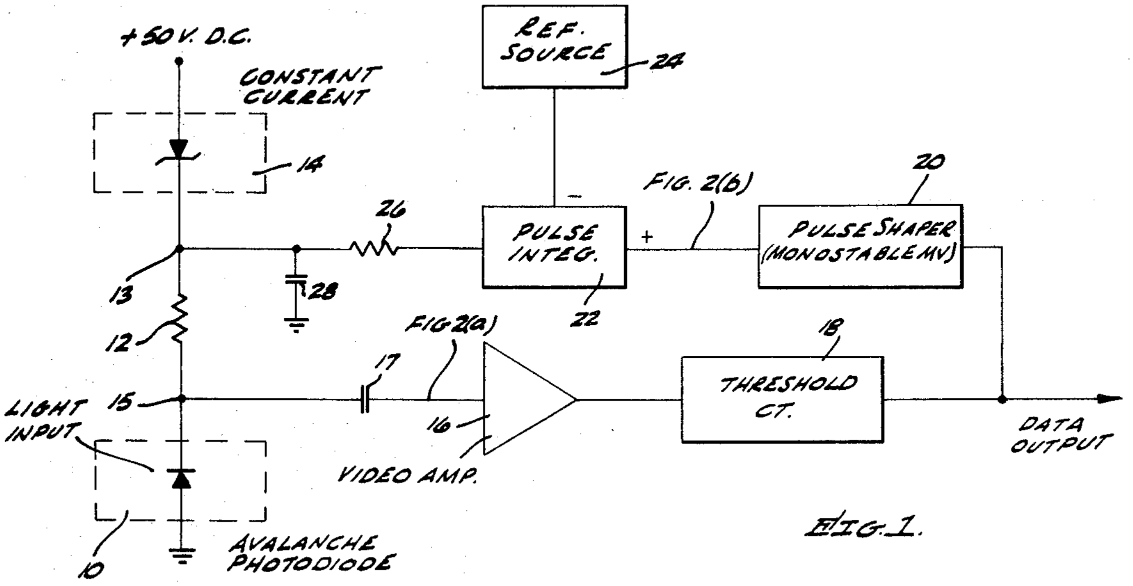
FIG. 1 is a block diagram of a first embodiment of the invention.

Attention is now called to FIG. 1 of the drawing which illustrates a block diagram of a preferred embodiment of the invention. More particularly, FIG. 1 illustrates a control circuit for controlling the bias current supplied to a photodetector element 10, illustrated as constituting an avalanche photodiode. The photodiode is connected in series circuit branch between a source of positive potential, nominally shown as +50 v. DC, and ground. More particularly, the photodiode 10 is connected in series with a resistor 12 and a constant current diode 14. The junction 15 between the photodiode 10 and the resistor 12 is connected to the input of a video amplifier 16 through a coupling capacitor 17.

Assume for the moment that the potential at the junction 13 between resistor 12 and constant current diode 14 is uncontrolled. As a consequence, a constant current will be supplied by the diode 14 through resistor 12 allowing diode signal to flow to the video amplifier 16. When a light pulse is incident on the photodiode 10 it will increase conduction therethrough to thus cause an input into the video amplifier 16. The output of the video amplifier 16 is connected to a threshold circuit 18. In the absence of any photodiode or amplifier input noise, a light input pulse is detected when the output of the video amplifier 16 exceeds the threshold level established by the threshold circuit 18. In the absence of photodiode or amplifier input noise, it would, of course, be desirable to maximize the sensitivity or gain of the photodiode 10 in order to maximize the probability of recognizing light pulse input signals. However, due to the ever-present existence of input noise and the large avalanche noise of the photodetector when operated at maximum gain, the gain or sensitivity must be carefully selected so that noise pulses are not mistakenly identified as light pulse inputs. In accordance with the present invention, a feedback path is provided coupling the output of threshold circuit 18 to the junction 13 between the resistor 12 and constant current diode 14. By controlling the potential at the junction 13, the gain or sensitivity of the avalanche photodiode is controlled.

In conventional operations of a photodetector, such as in distance-measuring equipment, a certain amount of noise can be tolerated if that noise is known within reasonable limits. For example, in a typical application, it may be reasonable to tolerate a 1 percent false alarm rate. That is to say, the overall performance of the distance-measuring equipment will not be adversely effected if 1 percent of the signals interpreted as true light pulse inputs are in fact attributable to noise. The system in accordance with the present invention assures the maintenance of a desired noise level or false alarm rate while maximizing the system sensitivity or gain consistent with that rate. Briefly, in order to maintain a constant false alarm rate, the noise or number of false alarms is continually monitored with the system gain or sensitivity being adjusted to statistically assure that only one false alarm will occur in 100 intervals of interest, e.g., ranging operations.

In accordance with the embodiment of the invention illustrated in FIG. 1, the output of threshold circuit 18 is connected to the system data output terminal which, for example, is coupled to the input of data-processing equipment (not shown). In addition, the output of threshold circuit 18 is connected to a pulse shaper circuit 20 comprising a monostable multivibrator. The function of the pulse shaper 20 is to generate a shaped pulse output for each video amplifier output exceeding the threshold level except that the pulse shaper will ignore any video pulses which occur during its astable interval. The pulse length of the pulse shaper monostable multivibrator is selected to be long compared to the interval of a ranging operation in order to assure that a single ranging operation can contribute no more than a single count to the integrator 22. For example, a typical ranging operation may take an interval of from 200 to 400 microseconds. Typically, therefore, the monostable multivibrator will be selected to have an astable interval of 1 millisecond.

The pulse-shaping circuit 20 provides a shaped pulse, of fixed magnitude and duration, each time a video amplifier output pulse switches the monostable multivibrator to its astable state. The shaped pulse provided by the circuit 20 is coupled to a pulse integrator circuit 22. The pulse integrator circuit can constitute a simple RC integrator or any of several other types.

The pulse integrator 22 has a second terminal connected to the output of a reference source 24 which provides a signal related to the desired false alarm rate. The reference source can, for example, comprise a constant current source or a pulse source providing an average current proportional to the desired false alarm rate. The output of the pulse integrator 22 is connected through a resistor 26 to the junction 13 between the resistor 12 and constant current diode 14. A capacitor 28 couples the junction 13 to ground.

In the operation of the embodiment of FIG. 1, video amplifier output pulses, whether a consequence of signal inputs or noise, that exceed the threshold defined by threshold circuit 18 are shaped by the pulse shaper 20 to yield a pulse of uniform amplitude and duration. This action of pulse shaper 20 weights each noise pulse equally so that noise is effectively translated into a false alarm rate suitable for integration. As previously pointed out, the pulse integrator 22 has two inputs. The shaped pulses provided by circuit 20 are applied to the additive or incrementing input terminal of the pulse integrator 22. The signal provided by reference source 24 is provided to the subtractive or decrementing input terminal of integrator 22. Thus, the reference source 24 establishes the average current flowing out of pulse shaper 20 for steady-state operation of the integrator 22. A stable output of the integrator 22 is reached only when the average current of the pulses applied to the input terminal thereof is equal to the current from the reference source 24 assuming a near perfect integrator. In order to reach a stable condition of the integrator 22, the average actual false alarm rate must increase or decrease until the average current delivered to the integrator attributable to the shaped pulses provided by circuit 20 equals the average current delivered to the integrator by the reference source 24. The output of the integrator 22 adds to or subtracts from a fixed biased potential established at the junction 13.

The gain in noise output of an avalanche photodiode is critically dependent upon bias. Also, the optimum operating point is that bias for which the avalanche diode noise becomes significant in the video amplifier output noise. Consequently, the threshold level should preferably be set far enough above the amplifier noise to obtain a predetermined false alarm rate based on the avalanche photodiode noise contribution to total noise. When the feedback loop in FIG. 1 is closed, the integrator will send correction signals to the bias circuit raising the bias if the false alarm rate is low or lowering the bias if the false alarm rate is too high. Thus, the photodiode bias is automatically held at that point where the photodiode noise exceeds the amplifier noise by an amount determined by the threshold setting.

Figure 2:
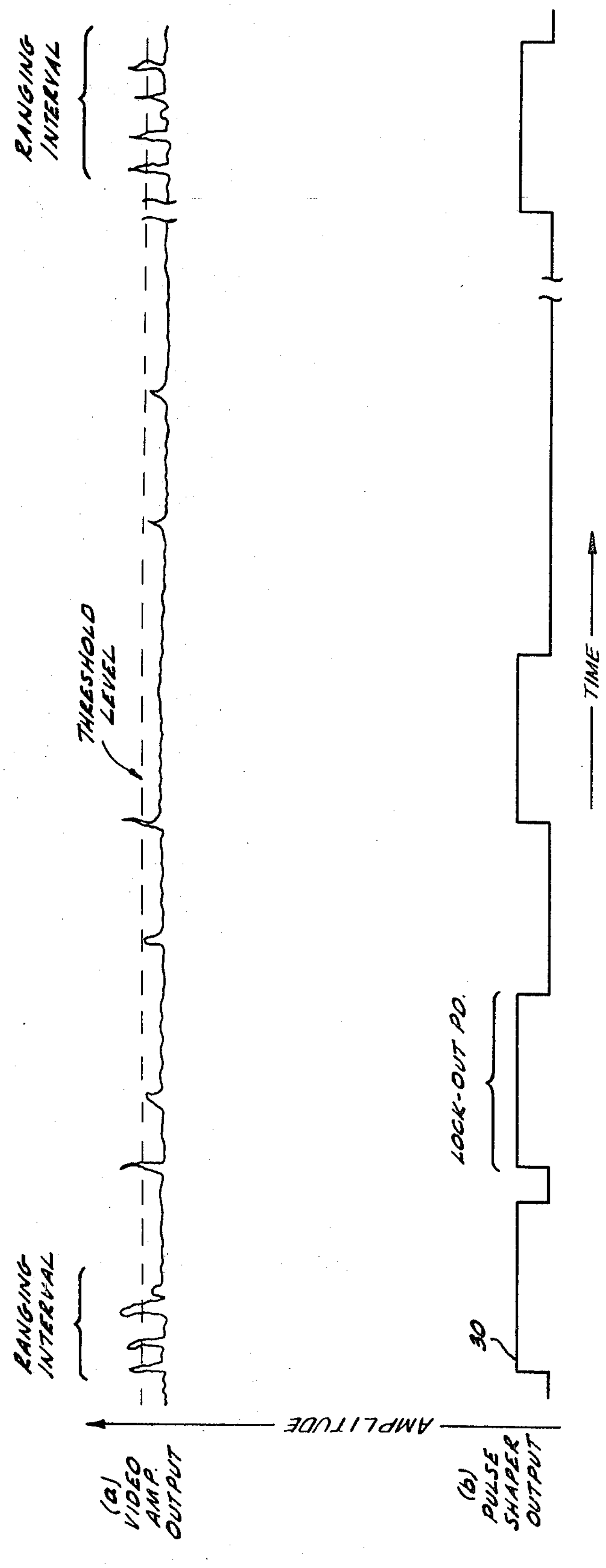
FIG. 2 is a waveform diagram illustrated to facilitate the explanation of the control circuit of FIG. 1.

In order to still better understand the operation of the embodiment of FIG. 1, attention is called to FIG. 2 which illustrates in line (a), an arbitrary signal at the output of video amplifier 16 and in line (b), the shaped pulses provided by pulse shaper 20. Note, in line (a), the indication of the threshold level. When the video amplifier output excursion exceeds the threshold level, the pulse shaper 20 provides the shaped pulse output 30 illustrated in line (b). Additionally, the pulse shaper monostable multivibrator then defines an astable interval constituting a lockout period during which the pulse shaper ignores any further input pulses. After the termination of the lockout period, the next excursion of the video amplifier output exceeding the threshold level again triggers the pulse shaper to initiate another lockout period and to provide another shaped output pulse to the pulse integrator 22.

Note in line (a) of FIG. 2, that in the course of a ranging operation, several noise pulses may be generated within a short interval. As a consequence of providing a lockout period having a duration longer than the duration of a ranging operation, only one false alarm will be counted for each ranging operation.

Again, assume that a 1 percent false alarm rate is desired. If in each ranging operation requiring an interval of 400 microseconds there is a 100-microsecond interval susceptible to noise, it follows that in order to assure the desired false alarm rate, that the gain or sensitivity be adjusted so that false alarms occur at the rate of 1 per 10 milliseconds. It will therefore be appreciated that the reference source 24 can provide a current to the pulse integrator 22 equal to the average current from the pulse shaper 20 for 1 pulse every 10 milliseconds. The close-loop operation previously discussed will in turn cause the system sensitivity to be established at a level which causes the pulse shaper 20 to also provide an average of 1 shaped pulse per 10 milliseconds. This stable condition will therefore yield the desired 1 percent false alarm rate for the noise-susceptible 100-microseconds interval. If the noise level changes due, for example, to temperature or background changes, then the bias must be adjusted to in turn vary the sensitivity to maintain the pulse shaper output at an average of 1 per 10 milliseconds.

Figure 3:
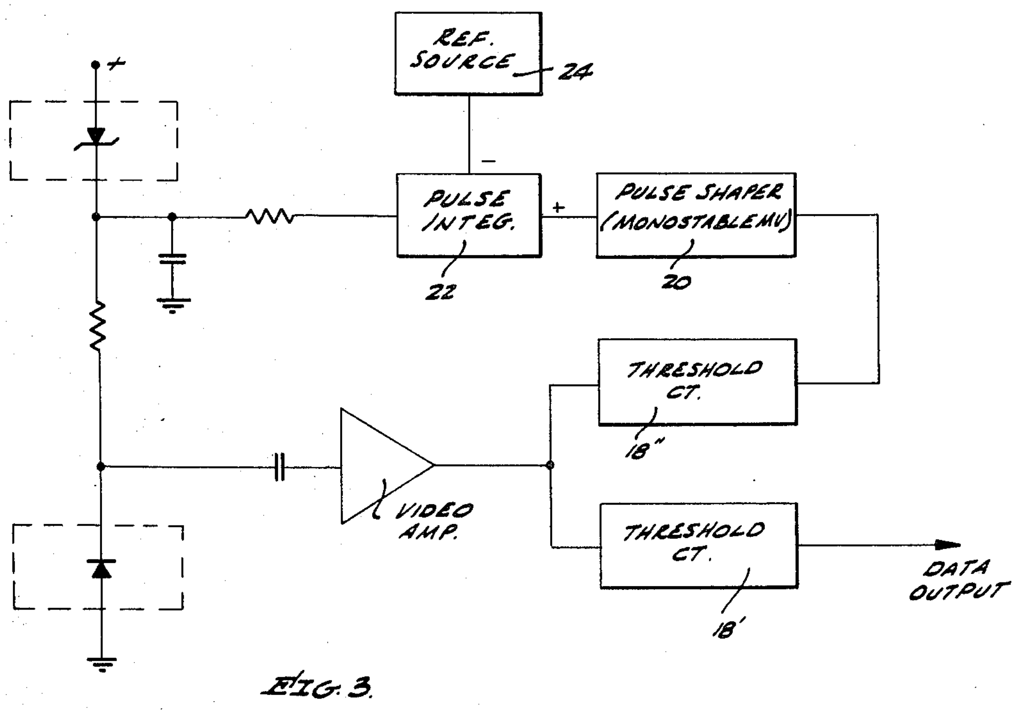
FIG. 3 is a block diagram of an alternate embodiment of the invention.

As should now be appreciated, the embodiment of FIG. 1 utilizes a single threshold level defined by the threshold circuit 18, for the purpose of deriving data output pulses and for the purpose of feeding the pulse integrator 22 to control the bias. In contrast, the embodiment of FIG. 3 employs two separate threshold circuits 18′ and 18″ which respectively define different threshold levels. More particularly, threshold circuit 18′ is coupled to the output of video amplifier 16 and defines a threshold level corresponding to that established by the circuit 18 in FIG. 1. The threshold circuit 18″ can, however, define a considerably lower threshold level in order to provide pulses at a greater rate to the pulse shaper 20. The current provided by the reference source 24 will likewise have to be adjusted. The advantage of utilizing the additional threshold circuit 18″ in FIG. 3 and providing a lower threshold is to reduce the ripple or magnitude of incremental changes in the output of pulse integrator 22. Reduction of the ripple effectively reduces hunting with respect to an optimum operating point and increases speed and precision of operation.

From the foregoing, it should be recognized that a control circuit has been disclosed herein for controlling the bias supplied to a photodetector circuit in order to maintain a constant false alarm rate while maximizing the probability of detection of input signals.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. 1. A circuit for biasing a photodetector so as to substantially maintain a selected false alarm rate, said circuit comprising:

threshold means for providing threshold output signals when the signals from said photodetector exceed a predetermined threshold level;

a pulse generator coupled to said threshold means for providing current pulses of a predetermined duration in response to said threshold output signals;

reference current source means for providing a reference current having an average value which is preselected as a function of said false alarm rate;

integrator means for providing an output signal which is a function of the integral of the difference in magnitudes of said current pulses and said reference current; and means responsive to the output signal of said integrator means for applying bias current to said photodetector to cause the sensitivity thereof to decrease when said current pulses occur at a rate in excess of a predetermined rate and increase when said current pulses occur at a rate less than said predetermined rate.

2. The circuit of claim 1 adapted for use with a pulsed energy transmission and reception system having an effective maximum range such that photodetector output signals, derived from received energy from targets at a greater range than said maximum range, are less than said predetermined threshold level; and wherein said pulse generator is a monostable multivibrator which when triggered by a threshold output signal provides an output current pulse of a duration approximately equal to or greater than the time interval corresponding to the effective maximum range; whereby no more than one current pulse is produced by target signals during each transmission and reception period.

3. The circuit of claim 1 further comprising a data output terminal; and second threshold means for providing output signals to said data terminal when the signals applied to said second threshold means from said photodetector exceed a level greater than said predetermined threshold level.

4. The circuit of claim 1 wherein said reference current source means includes a direct current source for providing a reference current having a predetermined magnitude which is a function of said false alarm rate.

5. The circuit of claim 1 wherein said reference current source means includes a source of current pulses for providing a reference current having an average current value proportional to said false alarm rate.

6. The circuit of claim 1 wherein said means for applying bias current includes a capacitance element coupled to receive the output signal of said integrator means, and a constant current source coupled to said capacitance element and to said photodetector such that the part of the output current from said constant current source applied to said photodetector is controlled by the charge on said capacitance element.

7. The circuit of claim 2 further comprising a data output terminal; and second threshold means for providing output signals to said data terminal when the signals applied to said second threshold means from said photodetector exceed a level greater than said predetermined threshold level.

8. The circuit of claim 2 wherein said reference current source means includes a direct current source for providing a reference current having a predetermined magnitude which is a function of said false alarm rate.

9. The circuit of claim 3 wherein said means for applying bias current includes a capacitance element coupled to receive the output signal of said integrator means and a constant current source coupled to said capacitance element and to said photodetector such that the part of the output current from said constant current source applied to said photodetector is controlled by the charge on said capacitance element.

10. The circuit of claim 9 wherein said reference current source means includes a direct current source for providing a reference current having a predetermined magnitude which is a function of said false alarm rate.

11. A circuit for biasing a photodetector so as to substantially maintain a desired false alarm rate; said circuit being adapted for use in a pulsed energy transmission and reception system having an effective maximum range such that photodetector output signals, derived from received energy from targets at a range greater than said maximum range, are less than a predetermined level; said circuit comprising:

a first threshold circuit responsive to output signals from said photodetector for providing threshold output signals when the signals from said photodetector exceed a level greater than said predetermined level;

a monostable multivibrator coupled to said first threshold circuit so as to provide an output current pulse of a predetermined amplitude and duration when triggered by a threshold output signal, the duration of said output current pulse being approximately equal to, or greater than, a time interval corresponding to the effective maximum range, whereby no more than one current pulse is produced by target signals during any given transmission and reception period;

a reference current source for providing a reference current having a constant amplitude which is preselected as a function of the desired false alarm rate;

an integrator for providing an output signal proportional to the integral of the difference between the magnitudes of said current pulses and said reference current; and means responsive to the output signal of said integrator for applying bias current to said photodetector to cause the sensitivity of said photodetector to decrease when said current pulses occur at a rate in excess of a preselected rate, and to increase when said current pulses occur at a rate which is less than said preselected rate.

12. The circuit of claim 11 wherein said means for applying bias current includes a capacitance element coupled to receive the output signal of said integrator, and a constant current source coupled to said capacitance element and to said photodetector such that part of the output current from said constant current source applied to said photodetector is controlled by the charge on said capacitance element.

13. The circuit of claim 11 further comprising a data output terminal; and a second threshold circuit for providing output signals to said data terminal when the signals applied to said second threshold circuit from said photodetector exceed a level greater than the threshold level of said first threshold circuit.

14. The circuit of claim 12 further comprising a data output terminal; and a second threshold circuit for providing output signals to said data terminal when the signals applied to said second threshold circuit from said photodetector exceed a level greater than the threshold level of said first threshold circuit.

* * * * *